UNITED STATES PATENT OFFICE.

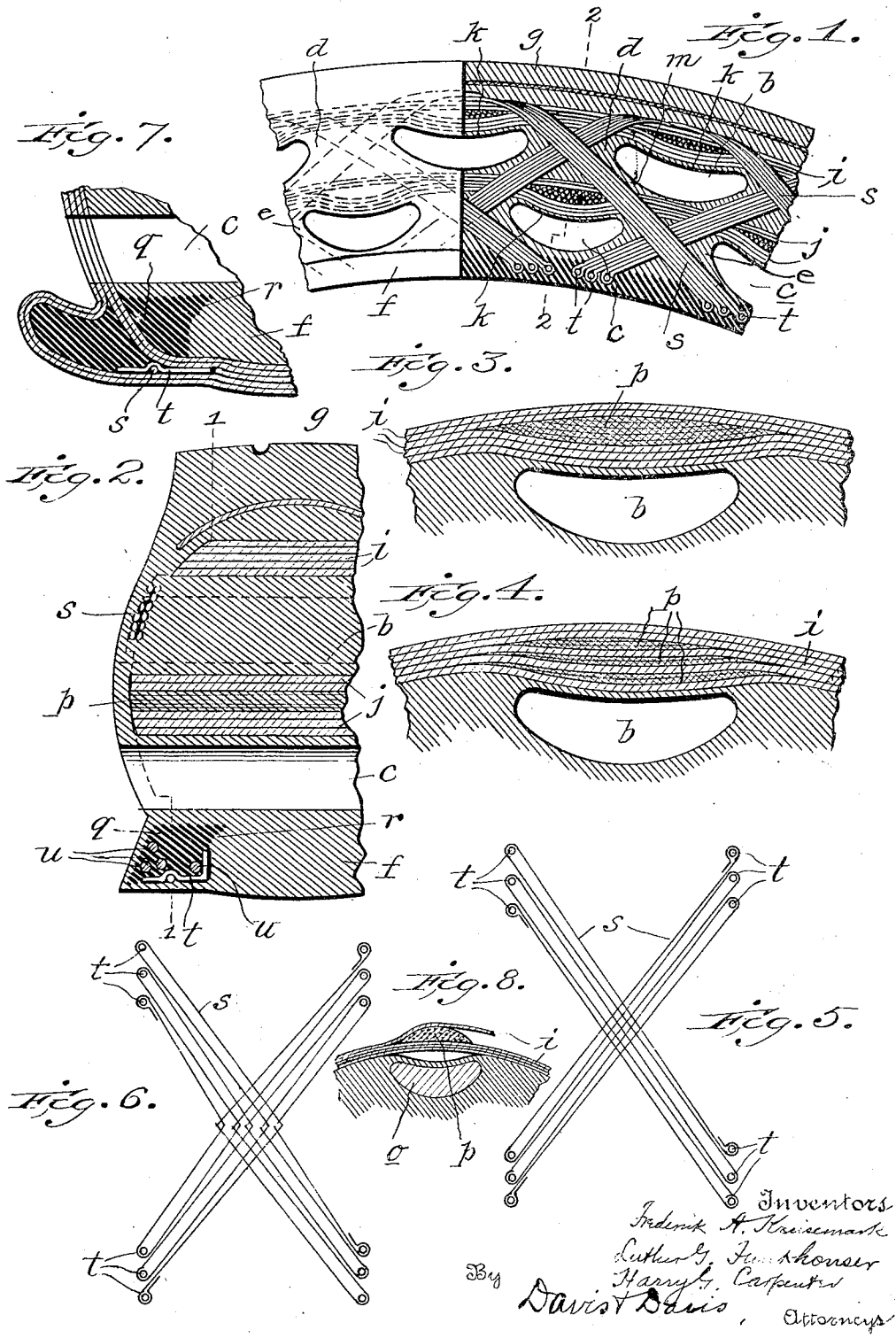

FREDERICK AUGUSTUS KRUSEMARK, LUTHER G. FUNKHOUSER, AND HARRY G. CARPENTER, OF ROANOKE, VIRGINIA, ASSIGNORS TO K. F. & C. TIRE & RUBBER CORPORATION, OF ROANOKE, VIRGINIA, A CORPORATION OF VIRGINIA.

CUSHION-TIRE.

1,277,953.        Specification of Letters Patent.     Patented Sept. 3, 1918.

Application filed March 9, 1918. Serial No. 221,535.

*To all whom it may concern:*

Be it known that we, FREDERICK AUGUSTUS KRUSEMARK, LUTHER G. FUNKHOUSER, and HARRY G. CARPENTER, citizens of the United States of America, and residents, respectively, of Roanoke, county of Roanoke, and State of Virginia, have invented certain new and useful Improvements in Cushion-Tires, of which the following is a full and clear specification.

This application is a substitute for and a continuation in part of our application filed August 21, 1917, Serial No. 187,405.

An object of this invention is to provide a structure which will insure not only the maximum of resiliency, but the most efficient degree of resiliency for this type of tire. A further object is to so construct the tire that it shall have a maximum of durability by reason not only of the provision of means for taking up the numerous and peculiar stresses that tires of this sort are subjected to, but also because of the ample provision for keeping down the temperature of the tire by thorough ventilation thereof while under traction strains. A still further object is to provide simple means whereby when the tire is secured on the rim by means of the usual clamping rings or beads, the body of the tire will be caused to frictionally grip the rim with a force proportionate to the degree of clamping action exerted by the clamping rings, as more fully hereinafter set forth.

In the drawings—

Figure 1 is a view of a portion of our improved tire, partly in side elevation and partly in section on the line 1—1 of Fig. 2;

Fig. 2 is a transverse sectional view taken on the line 2—2 of Fig. 1;

Fig. 3 is a detail longitudinal sectional view of a portion of the tire;

Fig. 4 is a similar view showing a slight modification;

Figs. 5 and 6 are diagrammatic views showing two different arrangements of the spiral cord-bands;

Fig. 7 is a detail view showing the manner of applying one feature of the invention to a tire of the clencher type;

Fig. 8 is a detail view showing the method of giving an extra degree of tautness to the truss bands over the openings.

The tire in its preferred form consists of a solid rubber mass suitably shaped in transverse section and provided with two circumferential series of slots $b$ and $c$, these slots extending transversely entirely through the tire from side to side, the slots of each series being separated sufficiently to form radial pillars $d$ between the slots of the outer series and similar pillars $e$ between the ends of the slots of the inner series, the slots of one series being staggered with reference to the slots of the other series, so as to bring each pillar $d$ opposite the center of the adjacent slot $c$ and each pillar $e$ opposite the center of the adjacent one of the slots $b$.

This arrangement of slots, that is, an inner row or series of circumferential slots and an outer row of circumferential slots, naturally divides the tire into three circumferential zones, which form in effect circumferential bands. One of these bands, designated by the letter $f$, forms means for securing the tire to the rim, another one of these bands forms the tread surface $g$ of the tire, while the central band or portion forms the connecting medium between the inner series of pillars $e$ and the outer series of pillars $d$. Embedded in the outer or tread band $g$ is a series of flat strips $i$ composed of cords laid side by side, or of canvas or other fibrous material, extending the entire circumference of the tire. In the central or intermediate zone, a similar series of bands $j$ is embedded. These bands run substantially parallel to each other except along the outer wall of each of the slots, at which point several of the bands dip or curve inwardly, the outer wall $k$ of the slot being bulged or curved inwardly sufficiently to permit this to be done. Thus inwardly convexing the outer wall of each of the slots and extending thereinto one or more of the strengthening bands $i$ or $j$ converts the outer wall of the slot into a truss-like member which, when the tire is radially squeezed by a load or shock, will cause the bands to be drawn circumferentially toward the distorted part of the tire, thus transmitting to the pillars $d$ and $e$ a material part of the strain, thereby tending to distribute and dissipate the strains of heavy loads and shocks. It will be observed also that the inwardly-bulged walls $h$, if the tire be distorted to an unusual extent by heavy loads or shocks, will strike against the opposite wall of the slot and thus permit the strain to the adjacent pillar $e$, thereby tending to arrest undue distortion of the tire and prevent injury thereto. The ends of the slots are rounded and the end portions of each slot overlap the end portions of the adjacent slots of the other series. This overlapping of the ends of the slots and the concaving or rounding of the ends of the slots gives an oppositely-tapering form to the part $m$ of the central band which lies between the overlapped parts of the slots, this tapering portion $m$ being indicated as lying between the dotted lines in Fig. 1. This oppositely-tapering portion $m$ forms virtually a connection between the adjacent inner pillars $e$ and outer pillars $d$, and thus shaping these connecting portions serves to greatly decrease the shearing or disrupting strain that is exerted when each of the outer pillars $d$ is forced inwardly by a load or blow. In this way, the maximum of resiliency is obtained and disrupting of the connections between the inner and outer series of pillars is prevented. This construction also, as will be observed, permits us to considerably elongate the openings $c$ and $b$ and thus reduce the number of these openings to a minimum.

To obtain the greatest possible degree of unsprung action, that is, the greatest degree of resiliency in band arrangement, we give to the truss portions of the bands $i$ and $j$ an extra degree of tautness where they are distorted or dipped inwardly over each of the openings. To obtain this extra degree of tautness, we proceed as follows in the course of building up the tire: After the base portion of zone $f$ and the pillars $e$ are built up on the jack-ring, solid core-pieces $o$, as shown in Fig. 8, are put in position to form the inner series of passages $c$. Then the inner layers of the bands $j$ are wound about the mass and properly positioned. Then filling masses $p$ are placed on these bands over each one of the openings $c$, these filling masses consisting preferably of cords or fabric arranged transversely of the tire, the fibers of the fabric being, as usual, coated with rubber to cause them to adhere to form a unitary mass. Then the outer layers of the bands $j$ are tautly wound on the mass, thus bringing to bear upon the outer face of the filling masses $p$ an inward radial pressure, the tautness and pressure on these outer layers of the bands being sufficient to force the filling masses $p$ radially inwardly, to thus form an inward dip in the inner layers of the bands over each of the openings and stretch the bands to an extra degree of tautness. After the desired number of outer layers $j$ are wrapped upon the tire and caused to adhere thereto in this manner, the outer pillars and core-pieces and bands $j$ and filling masses $p$ are built up in the same manner, and, when the tire is cured or vulcanized, all the fibrous parts become solidly embedded in the rubber mass and the distorted parts of the bands together with the filling masses form a pad-like truss over each opening, the truss effect being emphasized by reason of the extra tautness given to the inner layers of the band in the manner set forth. Instead of a single filling mass, as shown in Fig. 3, it will be understood, of course, that the mass may be divided up into separate pieces or masses and laid in between the bands $j$ or $i$, as shown in Fig. 4. After vulcanization the core-pieces $o$ are removed by pushing them endwisely out of the openings.

Formed integrally in each edge of the rim zone $f$ of the tire is a hard rubber ring-like mass $q$ beveled on its inner side to present an inclined face $r$ toward the rim-face of the tire, so that, when the opposite edges of the rim zone of the tire are pressed inwardly, the hardened beveled faces $r$ will cause the mass of rubber in the rim zone to bulge radially inwardly throughout its length. This inward bulge of the rim mass will cause a frictional grip of the tire against the periphery of the rim, thereby preventing circumferential creeping of the tire on the rim and also insuring a firm connection between the tire and the rim. In Fig. 7 this rim-gripping idea is illustrated as applied to a clencher tire, in which form of tire it is desirable that the hardened mass $q$ shall extend into the usual rim-bead to give the same the necessary degree of stiffness.

In this application, we illustrate a modification of the spiral band arrangement broadly covered in the co-pending application of Van Ness and Krusemark, Serial No. 190,539, filed September 10, 1917. In said application, the bands are spirally passed around the tire side by side without breaks except that the ends of the band or bands are anchored by being pasted to the mass. In our present arrangement, these bands are made of pieces of cord $s$ wound spirally from one side of the tire to the other and then back again a sufficient number of times to form a band of the proper width, as shown particularly in diagrammatic Figs. 5 and 6, anchoring pins $t$ being arranged at the sides of the tire adjacent the rim to anchor the loops formed by folding the cord back and forth, said pins $t$ and the end loops of the cords being embedded in the above-described hard masses $q$ in order to secure an effective anchoring of the cord-loops at points adjacent the rim.

The cords may be passed from side to side of the tire as shown in Fig. 5, with crossings in the tread surface and also at points intermediate the openings; or they may be passed from the side up around the tire to the tread surface and then down again to the same side of the tire, as shown in Fig. 6, in which case they will desirably be interlocked with each other at the tread surface. In any case, however, these cords will, as usual, be coated with sticky rubber, so as to hold their positions when properly placed around the partly-completed tire in the process of making the same; and, when the rubber mass is vulcanized, they of course will be embedded in the mass and the bands formed by the cords will cross each other not only on the tread surface over each of the outer openings $b$, but also at the sides of the tire at points between the openings, so that, with our arrangement, there will be the same advantageous results as are gained by the spiral arrangement of bands covered by said co-pending application of Van Ness and Krusemark.

To assist in anchoring the anchoring pins $t$ and the loops of the cords $s$ and for the purpose also of strengthening the rim portion of the tire, we prefer embedding in each of the hard ring masses $q$ a series of wire rings $u$.

The nature and scope of the invention having been thus indicated and its preferred embodiment having been specifically described, what is claimed as new is:

1. A rubber tire provided with two series of transverse slots extending circumferentially, the slots of one series overlapping the slots of the other series, the outer walls of the outer slots arching inwardly, strengthening bands embedded in the tire extending circumferentially thereof in the zone outside of the outer series of slots, one at least of these bands following the curvature of the arched outer walls of the slots, for the purposes set forth.

2. A rubber tire provided with a series of transverse slots extending circumferentially of the tire, the outer wall of each of these slots arching inwardly, strengthening bands embedded in the tire and extending circumferentially thereof in the zone outside of the outer walls of the slots, one at least of these bands following the curvature of the arched outer walls of the slots, for the purpose set forth.

3. A rubber tire provided with an outer series of circumferential slots as well as an inner series of similar slots extending from side to side of the tire and open at their ends, the slots of one series overlapping the slots of the other series, the transverse edge-walls of the slots being rounded so as to thereby form a series of radial pillars staggered with reference to each other and connected together by circumferentially-extending portions of the tire which taper in opposite directions, and circumferential bands embedded in the body of the tire and extending through the rubber mass at the inner ends of the outer pillars and the rubber mass at the outer ends of the inner pillars and also through said oppositely-tapering portions.

4. A cushion tire consisting of a resilient mass provided with a circumferential series of slots extending from side to side of the tire, having embedded in the mass outside of said slots a series of circumferential fibrous bands, one or more of these bands being dipped inwardly over each of the outer walls of said slots.

5. A cushion tire consisting of a resilient mass provided with transverse slots, these slots being arranged in a circumferential series and extending from side to side of the tire, a fibrous strain-distributing band extending circumferentially of the tire between said slots and the tread surface, this band being dipped inwardly over the outer wall of each of said slots, this dipped part of the band being stretched.

6. A resilient tire consisting of a rubber mass provided with a circumferential series of transverse slots, a plurality of bands extending through the mass between said slots and the tread surface, the bands being separated by filling masses at points over said slots to thus cause the inner bands to bulge or dip inwardly toward said slots, these inwardly-bulged parts of the bands being stretched to give an extra degree of tautness to these inner bands.

7. A cushion tire having embedded in its rim zone a pair of hardened ring-like masses around each side edge of the tire, the inner faces of these masses being beveled or inclined, these beveled faces facing toward the rim face of the tire, for the purpose set forth.

8. A cushion tire provided with transverse slots arranged in a circumferential series and having embedded in its mass a series of spirally-arranged bands crossing each other at points between the slots and the tread zone of the tire, each of these bands consisting of a cord folded back and forth and having its looped ends anchored in the rim zone of the tire.

9. The structure recited in claim 8, anchoring pins being provided in the rim zone for said loops and around which said loops engage.

10. The structure recited in claim 9, a hard rubber ring-like mass being provided at each side edge of the tire in the rim zone in which said pins and said loops are embedded, for the purpose set forth.

11. A cushion tire provided with two circumferential series of transverse passages, one series being staggered with reference to the other and arranged in overlapping relation thereto, thereby forming virtually an inner series of pillars and an outer series of pillars, circumferential bands embedded in the tire adjacent the outer walls of each series of passages, and bands embedded in the tire adjacent said bands and having portions which dip toward the rim side of the tire adjacent each of said passages.

In testimony whereof we hereunto affix our signatures this 7th day of Mar., 1918.

FREDERICK AUGUSTUS KRUSEMARK.
LUTHER G. FUNKHOUSER.
HARRY G. CARPENTER.